US006594051B1

(12) United States Patent
Chaplin et al.

(10) Patent No.: US 6,594,051 B1
(45) Date of Patent: Jul. 15, 2003

(54) DATA COMMUNICATION SYSTEM FOR HAND-HELD COMPUTERS

(75) Inventors: Raymond Chaplin, Towcester (GB); Darren Childs, Milton Keynes (GB); Mark England, Hitchin (GB); Gerald Henson, Hanslope (GB); Anthony Marsden, Milton Keynes (GB); Shane Thornton, Barrington (GB)

(73) Assignee: Radix Micro Devices PLC, Milton Keynes (GB)

(*) Notice: Subject to any disclaimer, the term of this patent is extended or adjusted under 35 U.S.C. 154(b) by 0 days.

(21) Appl. No.: 09/281,559

(22) Filed: Mar. 30, 1999

(30) Foreign Application Priority Data

Mar. 31, 1998 (GB) ............................................. 9907423

(51) Int. Cl.⁷ ............................................. H04B 10/00
(52) U.S. Cl. .................. 359/152; 359/173; 359/172; 359/163; 359/159
(58) Field of Search ................................ 359/152, 163, 359/173, 159, 172

(56) References Cited

U.S. PATENT DOCUMENTS

| | | | | |
|---|---|---|---|---|
| 5,317,691 A | * | 5/1994 | Traeger ........................ 395/200 |
| 5,670,952 A | * | 9/1997 | Yamamoto et al. ...... 340/825.52 |
| 5,864,708 A | * | 1/1999 | Croft et al. .................. 395/821 |
| 5,928,292 A | * | 7/1999 | Miller et al. ..................... 701/1 |
| 6,038,048 A | * | 3/2000 | Harris et al. ................. 359/159 |
| 6,081,356 A | * | 6/2000 | Branc et al. ................. 359/118 |
| 6,137,260 A | * | 10/2000 | Wung et al. ................. 320/116 |
| 6,236,486 B1 | * | 5/2001 | Nocker, IV ................. 359/159 |

* cited by examiner

Primary Examiner—Leslie Pascal
Assistant Examiner—Hanh Phan
(74) Attorney, Agent, or Firm—Fay, Sharpe, Fagan, Minnich & McKee, LLP

(57) ABSTRACT

A docking apparatus for a plurality of hand-held computers having optical data ports is provided. The docking apparatus includes a plurality of docking bays, a central processing unit, an optical transmitting communication path connected to the central processing unit for transmitting data to the docking bays, and an optical receiving communication path connected to the central processing unit for receiving data from the docking bays. The transmitting and receiving communication paths include light guides adapted to carry the data between the central processing unit and the data port of each computer in its respective docking bay.

3 Claims, 7 Drawing Sheets

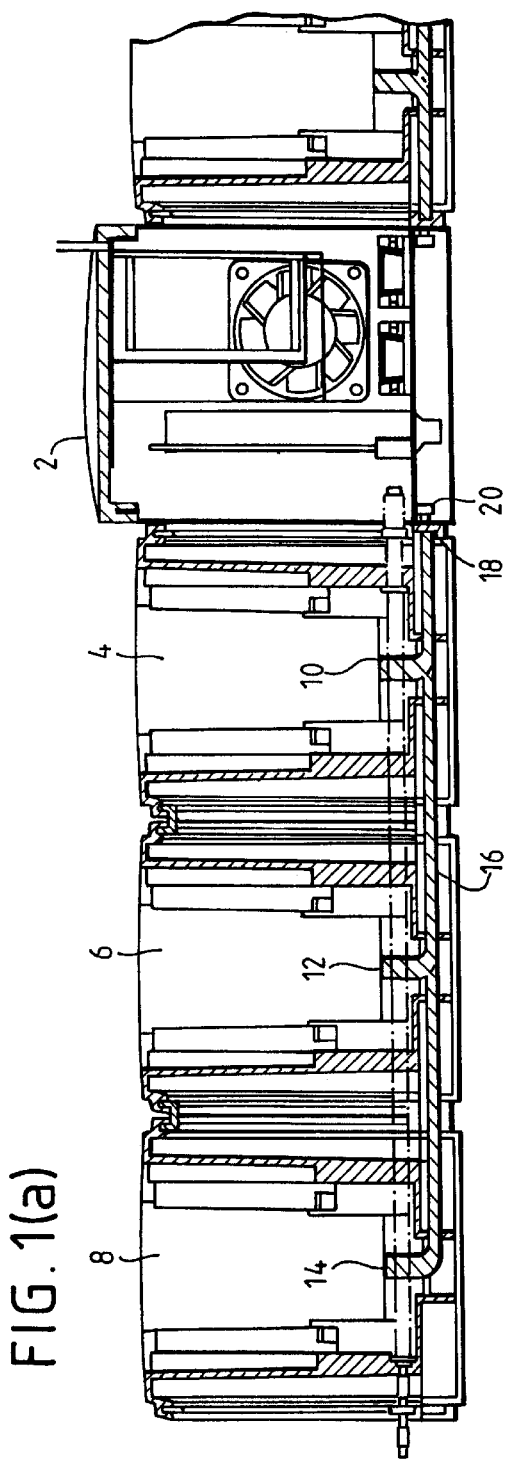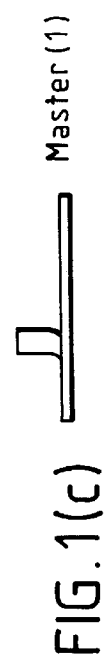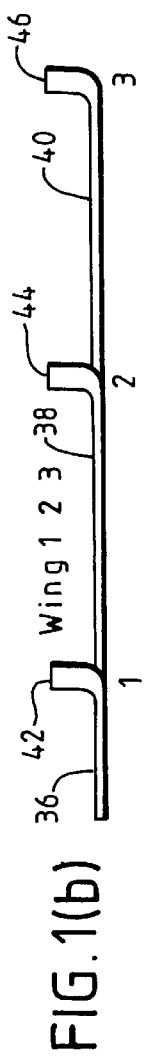
FIG. 1(a)
FIG. 1(c)
FIG. 1(b)

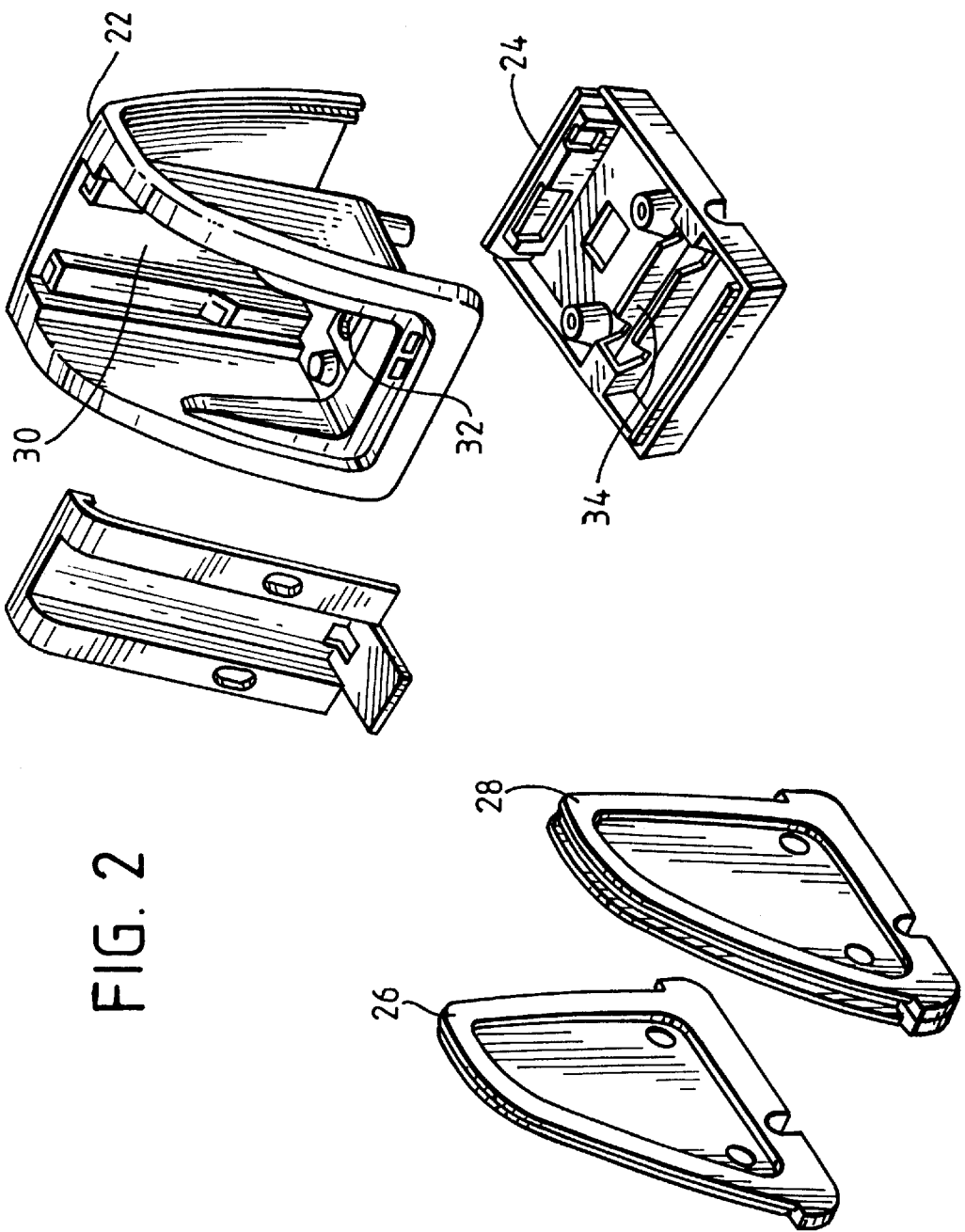

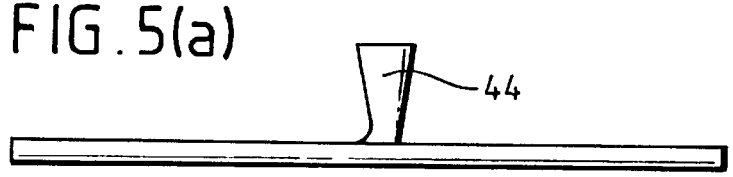
FIG. 5(a)
FIG. 5(b)
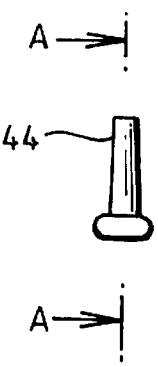
FIG. 5(c)
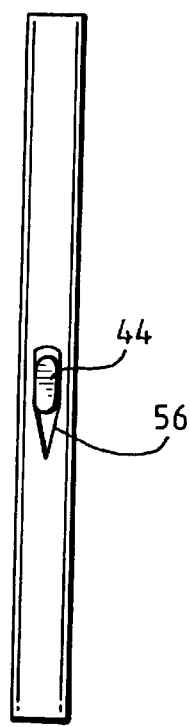
FIG. 5(d)
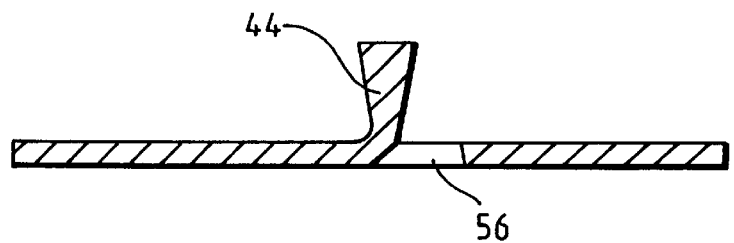
FIG. 5(e)
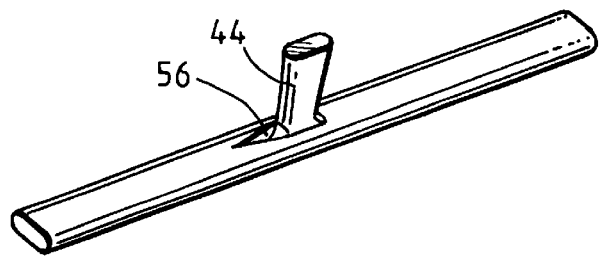

DATA COMMUNICATION SYSTEM FOR HAND-HELD COMPUTERS

This invention relates to portable or "hand-held" computers, and particularly to systems for loading data into such computers, or unloading data from them, for example, when they are brought back to a central office after being used to collect information "in the field".

Accordingly, the present invention seeks to provide a docking apparatus for a plurality of hand-held computers, which incorporates a data light guide system having a plurality of connections for communicating with each of the computers.

Preferably the docking system includes a multiple-bay housing in which each bay is adapted to receive one handheld computer unit, and to establish data communication with it by means of a branch of the light guide system.

Preferably, the light guides comprise rods of shaped transparent acrylic material or other suitable material, having branches which are adapted to communicate with individual bays of the housing.

The invention also extends to an optical data communication system comprising a transparent light guide having an optical signal transducer at least at one end; and at least one branch from the light guide, adapted to divert a part of the light passing through the guide, and an aperture formed in the guide at the side remote from the signal transducer, the upstream side of the aperture being angled to extend beneath the branch so as to form a reflecting surface.

Preferably, the optical link is an infra-red link which is physically compliant to the Infra-red Data Association ("IrDA") standard specifications, so as to enable standard sensors and transducers to be used.

It will be appreciated that the docking bays may also provide charging contacts for the portable computers, so that their internal batteries can be recharged whilst they are installed in the bays.

One advantage of using optical communications is that it simplifies the problems of electronic data-switching between a number of computers and a host system.

Some embodiments of the invention will now be described by way of example, with reference to the accompanying drawings, in which:

FIG. 1a is a schematic rear elevation of a first type of "loader/charger" system according to the invention;

FIG. 1b and 1c are drawings of light guide assemblies;

FIG. 2 is an exploded perspective view of a loader/charger bay designed on a modular basis;

FIGS. 5a to 5e are views of a second light guide component;

Figure 3A:
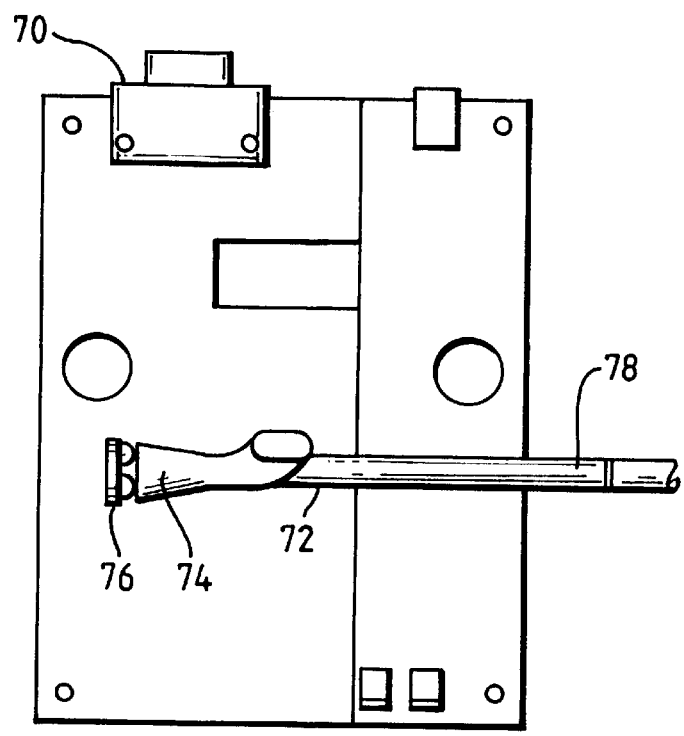
FIG. 3 shows PCB arrangements.

Referring firstly to FIG. 1a, the unit comprises a central console 2 which includes a central processor unit having a microprocessor, and a power supply which also powers the hand-held computers and provides charging power for them. The console also includes suitable communication ports including an RS232 port for communicating with a host computer, and a number of infra-red ports for communicating with the hand-held computers as will be explained in more detail below.

Connected to each side of the central console 2, are a series of three interlocking "docking bay" modules, 4, 6 and 8 into which individual hand-held computers (not shown) can be inserted for loading and charging. Each computer includes an optical communication port in its base, which co-operates with a respective branch 10, 12, or 14, of a light guide assembly 16 extending along the base of the assembly.

The inner end 18 of the rod assembly 16 communicates with an infra-red transducer 20 suitably positioned behind a window in the side of the central unit 2. It will be appreciated that a similar assembly of modules, not shown completely in the figure, is positioned on the other side of the central unit 2, and in addition, the console 2 can support a further pair of parallel assemblies 4, 6, 8 on each side (not shown) which enables it to support twelve computers altogether. The console incorporates sufficient processor power to enable it to handle the communications with all twelve computers.

The general configuration of each of the "docking bays" is illustrated in more detail in FIG. 2, and comprises an upper case member 22, a lower case member 24, and a pair of "end caps" which may be of either the configuration 26 (a "single end cap") or 28 (a "double end cap"). It will be appreciated that the "double end cap" 28 can be used to join two adjacent docking bay modules together, whilst the single end cap 26 will be used at the extreme end of the assembly.

As will be clear from the drawing, the upper case 22 provides a "pocket" 30 which is suitably shaped to receive a hand-held computer, and incorporates charging contacts for it, and the lower case member 24 is arranged to accommodate a light guide, which communicates with the handheld computer via an aperture 32 in the base of the pocket 30.

The lower case member 24 is thus formed with a trough 34 which accommodates a section 36, 38 or 40, of the light guide 16 (FIG. 1b), depending on the position of the docking bay, relative to the central unit. As can be seen from the drawing, each of the sections 36, 38 or 40 is formed with an upper branch member 42, 44 or 46, respectively, so as to form a light path communicating through the aperture 32 in the base of the upper case 22.

In a smaller installation instead of the intelligent console 2 of FIG. 1, an assembly of three docking bays 22, 24 as shown in FIG. 2 can be used to accommodate three handheld computers, with one module forming a "master" having a somewhat less powerful cpu than the console 2, a serial port for communication with a host computer, and a shorter light guide arrangement for communicating with its two slaves.

FIG. 3a illustrates the circuit board layouts for the "master" and "slave" units of the three unit assembly, including a serial port 70 for the master, and also illustrates the position of a light guide 72 in the base of the unit. As shown, one end 74 of the light guide communicates with IR transducer assembly 76, while the other end 78 connects to an external light guide assembly extending to the other modules.

Figure 3B:
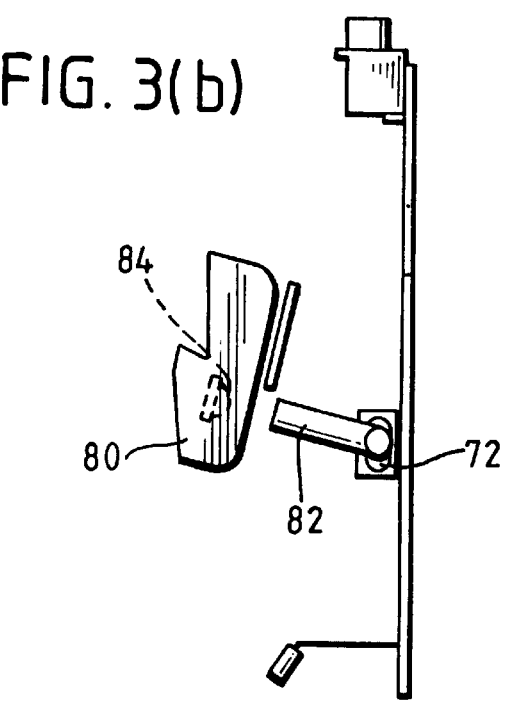

FIG. 3b is a partial "broken away" side view of the module, showing the position of the base 80 of a handheld computer co-operating with an upwardly-extending branch 82 of the light-guide 72. An IR transducer 84 is positioned behind a window in the base of the computer so as to align with the branch 82.

FIG. 4 illustrates in more detail, how the sections of light guide and their branches are formed so as to efficiently carry the light signal between the individual hand-held units, and the central unit 2 in the embodiment of FIG. 1a. FIG. 4 shows the lightguide for the position 10 closest to the central unit 2 in FIG. 1. In particular, as will clearly be seen from the side elevation 4a and the perspective view 4e, the "branch" 42 has a tapered cross-section, and a radiussed portion 48 at its base, on the side nearest to the central unit 2. As will also be clear from the views of FIGS. 4c and 4e in particular, the light guide rod itself is formed as a flat bar, the branch 42 having a relatively narrow horizontal cross-section (FIG. 4c) which is only about one third of the width of the light guide. This allows the passage of a portion of the light beam down either side of the light guide, past the branch 42.

In order to intercept a suitable portion of the beam, a cut-out 50 is formed in the light guide, on the "lee" side of the branch 42, which has a narrow V-shape in plan, to avoid causing unwanted reflections, with the leading face 52 of the cut-out 50 inclined at an angle of 45° to the axis of the light guide. As can be clearly seen from the vertical cross-sectional of FIG. 4d, this face is arranged immediately beneath the branch 42, so as to form a reflecting surface for the portion of the light beam which travels between the main part of the light guide, and the branch 42.

Figure 4A:
FIGS. 4a to 4e are different views of a first light guide component.
Figure 4B:
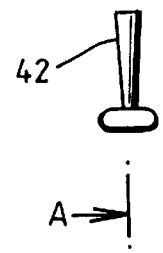
Figure 4C:
Figure 4D:
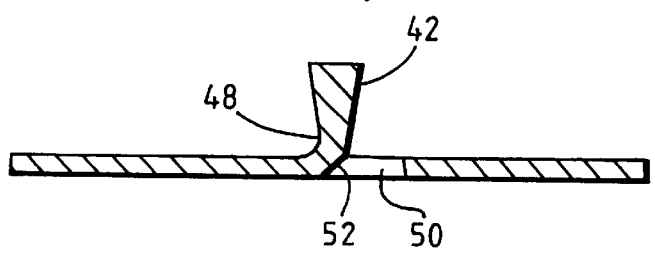
Figure 4E:
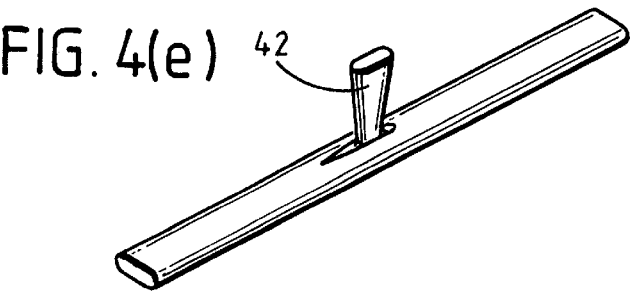
Figure 6A:
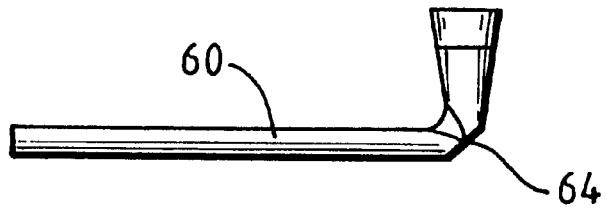
FIGS. 6a to 6d are views of a third light guide component.
Figure 6B:
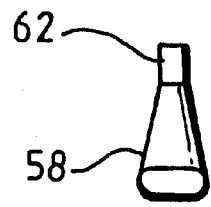
Figure 6C:
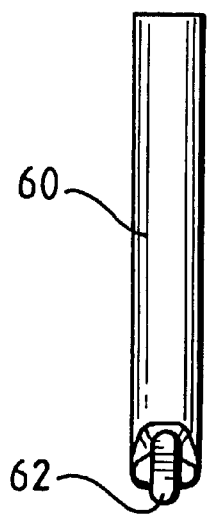
Figure 6D:
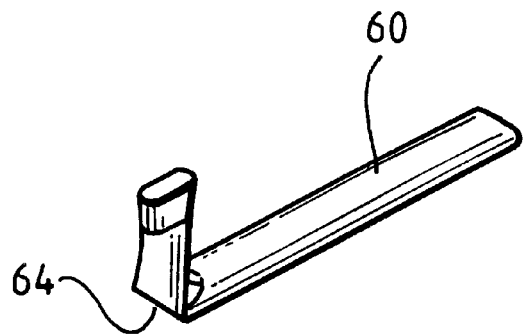
Figure 7A:
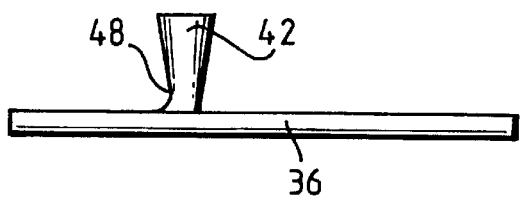
FIGS. 7a to 7e are views of a fourth light guide component.
Figure 7B:
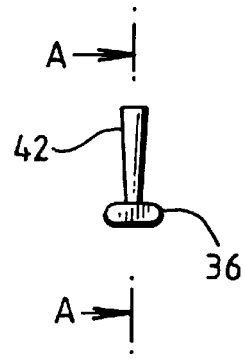
Figure 7C:
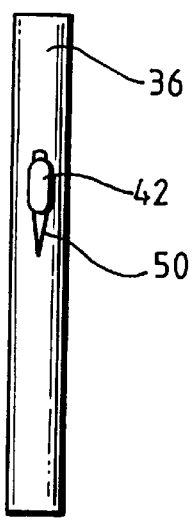
Figure 7D:
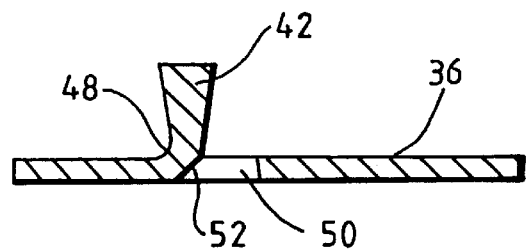
Figure 7E:
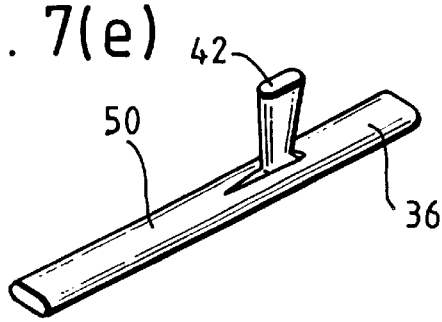

The light guide of FIG. 4 is intended for positioning closest to the CPU of the apparatus, and the branch 42 is therefore provided with a relatively narrow stem, as can be seen particularly from the view of FIG. 4b, so as to intercept a relatively small proportion of the light beam. In the next position, however, such as position 12 illustrated in FIG. 1, a larger proportion of the light beam needs to be intercepted to maintain the signal strength, and accordingly, the next segment of the light guide is formed with a branch 44 which is wider at its base, as shown in the various views of FIG. 5, and in particular, FIG. 5b. The cut-out 56 on the "lee" side of the branch is then made with a correspondingly wider V-shape. In other respects, the configuration of the branch member is similar to that of FIG. 5b.

FIG. 6 illustrates the branch member for the outermost position, such as position 14 in FIG. 1, where, of course, it is not necessary for the light beam to travel past the branch, and thus, in this position, the base 58 of the branch (FIG. 6b) is of the same width as the light guide 60, but tapers down, at its upper end, to the same shape as the light guide branches of FIGS. 4 and 5. Since the light beam is not required to travel further than the position of the branch, the branch simply forms a right angle with the remainder of the light guide 60, with a 45° "mirror surface" 64 formed at the junction, so as to deflect the whole of the light beam into or out of the branch.

FIG. 7 illustrates the configuration of the master light guide 72 for the arrangement of FIG. 3, which is similar to the light guide of FIG. 4, and will not therefore be described in detail but has been correspondingly referenced.

As will be seen from the drawing the branch 42 in FIG. 7 is closer to one end than that of FIG. 4, because of the position of transducer assembly 76 of FIG. 3, relative to the docking bay of the master unit.

The use of optical communications for the docking system has a number of advantages. The number of electrical contacts to be made on insertion of the hand-held computer is greatly reduced, since contacts are only required for charging current, and of course this increases reliability. In addition, problems of R.F. interference are avoided: these could otherwise be serious as lines radiating out from the CPU to the docking bays could form a strong source of R.F. radiation. Similarly, pick-up of stray signals or electrostatic discharges is also avoided. The use of simple moulded plastics light guides also avoids the need for very accurate alignment of components that would be required for fibre-optics, as well as simplifying manufacture of components.

What is claimed is:

1. A docking apparatus for a plurality of hand-held computers having optical data ports, comprising: a plurality of docking bays, a central processing unit, optical transmitting means connected to the central processing unit for transmitting data to the docking bays, and optical receiving means connected to the central processing unit far receiving data from the docking bays; the transmitting and receiving means including light guides adapted to carry the data between the central processing unit and the data port of each computer in its respective docking bay, in which each light guide comprises at least one rod of transparent material having a series of branches which are adapted to communicate with individual bays of the housing positioned at different distances from the CPU, and in which each light guide comprises at least one rod of flattened cross-section, each branch being arranged to extend outwardly from the flattened region, and having a width which is less than the width of the rod, whereby a light beam passing through the rod is only partially diverted into the branch.

2. A docking apparatus for a plurality of hand-held computers having optical data ports, comprising: a plurality of docking bays, a central processing unit, optical transmitting means connected to the central processing unit for transmitting data to the docking bays, and optical receiving means connected to the central processing unit far receiving data from the docking bays; the transmitting and receiving means including light guides adapted to carry the data between the central processing unit and the data port of each computer in its respective docking bay, in which each light guide comprises at least one rod of transparent material having a series of branches which are adapted to communicate with individual bays of the housing positioned at different distances from the CPU, and in which each light guide comprises at least one rod of flattened cross-section, each branch being arranged to extend outwardly from the flattened region, and having a width which is less than the width of the rod, whereby a light beam passing through the rod is only partially diverted into the branch; the rod having an aperture formed on the downstream side of the branch remote from the central processing unit, and the upstream side of the aperture being angled so as to extend beneath the base of the branch to form a reflecting surface for a light beam entering or leaving the branch.

3. A docking apparatus for a plurality of hand-held computers having optical data ports, comprising: a plurality of docking bays, a central processing unit, optical transmitting means connected to the central processing unit for transmitting data to the docking bays, and optical receiving means connected to the central processing unit far receiving data from the docking bays; the transmitting and receiving means including light guides adapted to carry the data between the central processing unit and the data port of each computer in its respective docking bay, in which each light guide comprises at least one rod of transparent material having a series of branches which are adapted to communicate with individual bays of the housing positioned at different distances from the CPU, and in which each light guide comprises at least one rod of flattened cross-section, each branch being arranged to extend outwardly from the flattened region, and having a width which is less than the width of the rod, whereby a light beam passing through the rod is only partially diverted into the branch; successive branches, spaced along the light guide, having greater widths in accordance with their distances from the central processing unit so as to divert more light and thus to compensate for reduction in the intensity of the light beam.

\* \* \* \* \*